United States Patent
Madden et al.

(10) Patent No.: US 6,830,066 B1
(45) Date of Patent: Dec. 14, 2004

(54) VALVE WITH POSITIVELY DRIVEN SENSING SWITCH CONNECTION

(75) Inventors: Jeremy S. Madden, Lavonia, GA (US); Ted R. Price, Westminster, SC (US)

(73) Assignee: Ross Operating Valve Co., Troy, MI (US)

(*) Notice: Subject to any disclaimer, the term of this patent is extended or adjusted under 35 U.S.C. 154(b) by 0 days.

(21) Appl. No.: 10/684,289

(22) Filed: Oct. 10, 2003

(51) Int. Cl.$^7$ .............................................. F16K 37/00
(52) U.S. Cl. ................................. 137/554; 137/625.64
(58) Field of Search ............................ 137/554, 625.64

(56) References Cited

U.S. PATENT DOCUMENTS

| | | | |
|---|---|---|---|
| RE28,520 E | | 8/1975 | Mahorney et al. .......... 137/596 |
| 4,216,795 A | * | 8/1980 | Cobb et al. ................. 137/554 |
| 4,227,547 A | | 10/1980 | Cameron .................... 137/554 |
| 4,338,965 A | * | 7/1982 | Garnjost et al. ............ 137/554 |
| 4,376,450 A | | 3/1983 | Fayfield et al. ............. 137/554 |
| 4,542,767 A | | 9/1985 | Thornton et al. ........ 137/596.16 |
| 4,922,952 A | * | 5/1990 | Kemmler .................... 137/382 |
| 4,967,792 A | | 11/1990 | Magee ....................... 137/552 |
| 5,156,185 A | * | 10/1992 | Lester ........................ 137/554 |
| 5,179,974 A | * | 1/1993 | Taniguchi ................... 137/554 |
| 5,218,994 A | * | 6/1993 | Jeschke ...................... 137/554 |
| 5,223,822 A | | 6/1993 | Stommes et al. ........... 137/556 |
| 5,518,028 A | | 5/1996 | Walker ....................... 137/554 |
| 5,538,037 A | | 7/1996 | Pizão ......................... 137/556 |
| 6,135,147 A | | 10/2000 | Peters et al. ................ 137/554 |
| 6,152,172 A | * | 11/2000 | Christianson et al. ....... 137/554 |
| 6,481,460 B2 | | 11/2002 | Fukano et al. .............. 137/554 |

FOREIGN PATENT DOCUMENTS

EP 0637396 12/1999

\* cited by examiner

*Primary Examiner*—A. Michael Chambers
(74) *Attorney, Agent, or Firm*—Mark Mollon

(57) ABSTRACT

A monitored fluid control valve is provided having a valve body with an elongated bore. A movable valve element is slidably received in the bore. A switch assembly has an aperture aligned with the bore. The switch assembly includes an electrical switch having a switch arm operatively connected to switch contacts for driving the switch contacts between an open state and a closed state. The switch arm is linked to the movable valve element so that the switch arm is directly driven to match linear reciprocation of the movable valve element.

10 Claims, 6 Drawing Sheets

VALVE WITH POSITIVELY DRIVEN SENSING SWITCH CONNECTION

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to monitoring the position of fluid valves, and, more specifically, to a manner of interconnecting a position sensing switch to a movable element of a valve.

Fluid valves are important components of modern industrial control and manufacturing systems. For example, they are used in controlling the application of pressurized air to pneumatically-operated machines such as presses and other machine tools. It is often desirable or necessary to monitor the position of automatically controlled valves to ensure that a particular valve proper actuates and deactuates appropriately. Monitoring may also be necessary to ensure the safety of the human operators. A monitoring signal may be used to generate a visual or audible indication of a malfunctioning valve, may be used to automatically deactivate system operation in response to a fault, or both.

Many different types of sensing technologies have been used for monitoring valve position. Magnetic sensors have been used wherein a movable valve element is configured to affect a magnetic field at a predetermined sensing location as the valve element moves between an actuated and a deactuated position. The magnetic field can be generated by a permanent magnet (either moving or stationary) or by an electromagnet. A magnet sensor has the advantage of having minimal interference with operation of the movable valve element, but has the disadvantage of being relatively expensive compared to other sensing technologies.

Pressure switches have also been used to monitor valve performance. Assuming a source of pressurized fluid (e.g., air) is present, then the position of a valve element can be monitored by detecting the presence of pressurized fluid in the outlet of the valve, for example. Pressure switches can be accommodated with essentially any kind of valve without affecting the design of the moving elements, but to they are also relatively expensive.

One of the more cost-effective sensing technologies has been the use of electric sensing switches wherein an electric switch is mechanically connected to the valve so that the conduction state of the switch is determined according to the position of the valve element. If a failure occurs in the switch, however, a false monitoring signal can be generated such that the valve is not in the same actuated or deactuated state that is currently being indicated by the monitoring signal. Potential switch failures include switch contacts that have welded shut and a broken return spring. Impacts of a moving valve component against the switch during each operating cycle of the valve have resulted in excessive wear, leading to these and other kinds of switch failures.

SUMMARY OF THE INVENTION

The present invention has the advantage of eliminating a main source of switch failures in electronic sensing switches for monitoring valve performance.

In one aspect of the invention, a monitored fluid control valve is provided having a valve body with an elongated bore. A movable valve element is slidably received in the bore. A switch assembly has an aperture aligned with the bore. The switch assembly includes an electrical switch having a switch arm operatively connected to switch contacts for driving the switch contacts between an open state and a closed state. The switch arm is linked to the movable valve element so that the switch arm is directly driven to match linear reciprocation of the movable valve element.

DETAILED DESCRIPTION OF PREFERRED EMBODIMENTS

Figure 1:
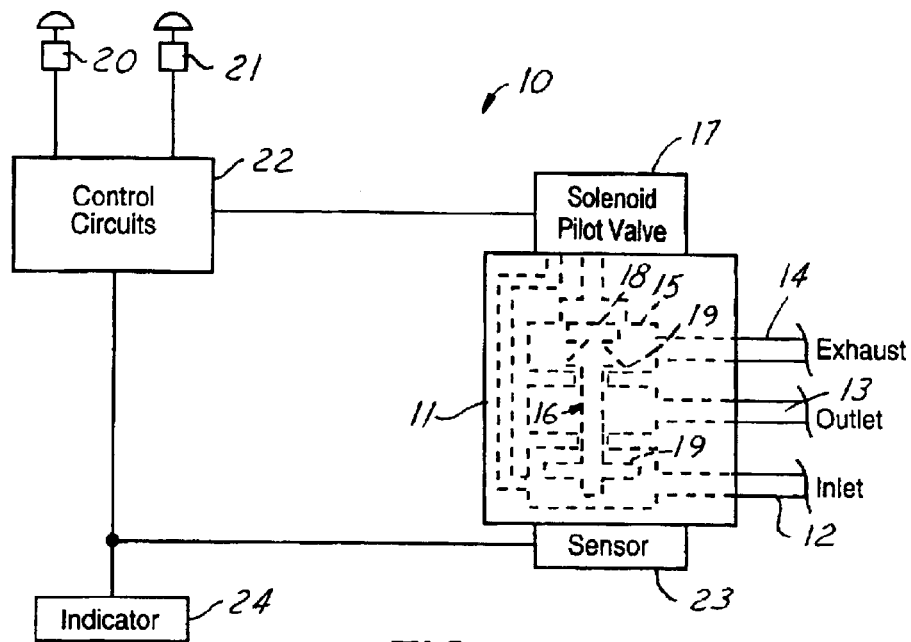
FIG. 1 is a block diagram showing an automatic valve control system.

Referring to FIG. 1, a control valve system for operating pneumatically controlled machinery is generally shown at 10. A control valve 11 has an inlet port 12 for connecting to a source of pressurized fluid (not shown), an outlet 13 for coupling to a piston or other control surface of pneumatically controlled machinery (not shown), and an exhaust port 14 coupled to atmosphere. Control valve 11 has a valve body including internal bore and passages 15 for receiving a movable valve element 16. A solenoid-operated pilot valve 17 is coupled to one end of valve 11 for providing actuating pressure from inlet port 12 to a piston surface 18 of moveable valve element 16. Poppets 19 are selectively opened and closed in response to actuation and deactuation of pilot valve 17 as is known in the art. Consequently, outlet port 13 is selectively connected either to inlet port 12 or exhaust port 14 so as to operate the pneumatically controlled machinery in a desired manner.

A pair of hand switches 20 and 21 are connected to control circuits 22. Dual operator push buttons are used in a control system of a stamping machine or press, for example, so that both hands of the human operator must be clear of the press in order to initiate an operating cycle of the press. Control circuits 22 detect the simultaneous activation of switches 20 and 21 to generate a control signal for operating solenoid pilot valve 17.

A sensor 23 is coupled to control valve 11 for detecting the actuated or deactuated state of movable valve element 16. A sensor signal is coupled to an indicator 24 for generating a visual indication of the state of the control valve. The sensor signal is also coupled to control circuits 22 to provide feedback allowing control circuits 22 to disable further operation of control valve 11 when an incorrect position of movable valve element 16 is indicated.

Figure 2:
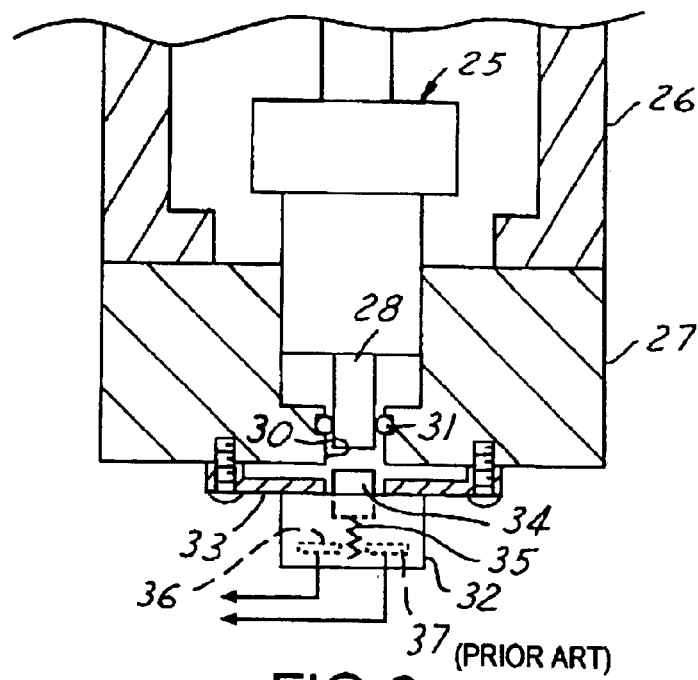
FIG. 2 is a side cross section of a valve and electronic sensing switch as used in the prior art with the valve in a first position.
Figure 3:
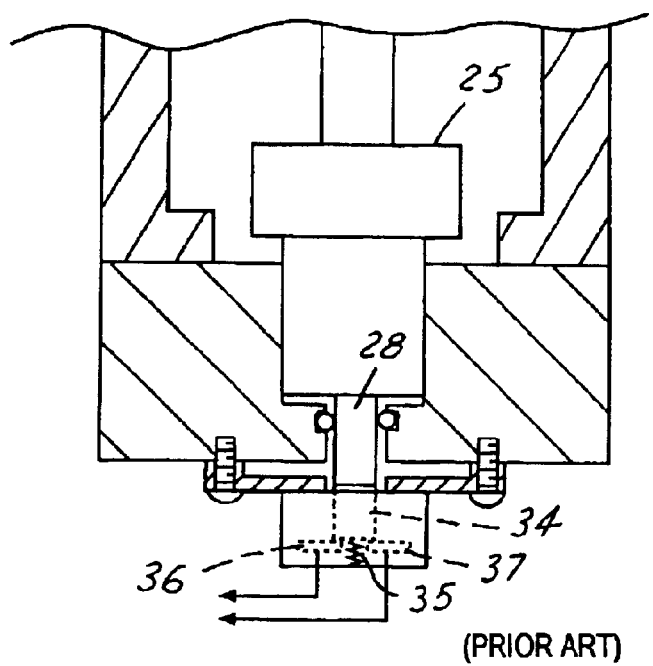
FIG. 3 is a side cross section of a valve and electronic sensing switch as used in the prior art with the valve in a second position.

FIGS. 2 and 3 show operation of an electric switch sensor for detecting the actuation state of the control valve. A movable valve element 25 is retained within a valve body having housing sections 26 and 27. An extension 28 at the lower end of movable valve element 25 extends through an aperture 30 in housing section 27. A seal 31 or other sealing means is provided for preventing loss of pressurized fluid from the control valve.

A sensing switch 32 is mounted in coaxial alignment with extension 28 by a fixture 33. A switch arm or switch operator 34 is slidably retained in switch 32 and is connected to a return spring 35 for urging operator 34 upward toward extension 28. Operator 34 preferably has a lower conductive surface which is selectively engagable with a pair of switch contacts 36 and 37. As shown in FIG. 3, when movable valve element 25 is in its actuated (i.e., lower) position, extension 28 pushes switch operator 34 against switch contacts 36 and 37, thereby compressing return spring 35. In that position, the switch contacts are in their closed state thereby providing a signal usable by the control circuits and/or indicator as described above. When movable valve element 25 returns to its deactuated position (as in FIG. 2), return spring 35 extends so that operator 34 returns to its uppermost position. Since extension 28 and operator 34 are not directly connected, they become separated from one another.

When extension 28 contacts switch operator 34 during an actuation, an impact force is created which shortens the cycle life of switch 32. For example, impacts may lead to breakage of return spring 35 such that switch 32 remains in its closed state even after extension 28 retracts back into aperture 30 when the valve is deactuated. The failure of switch 32 to return to its open state gives rise to a false sensor signal.

Figure 4:
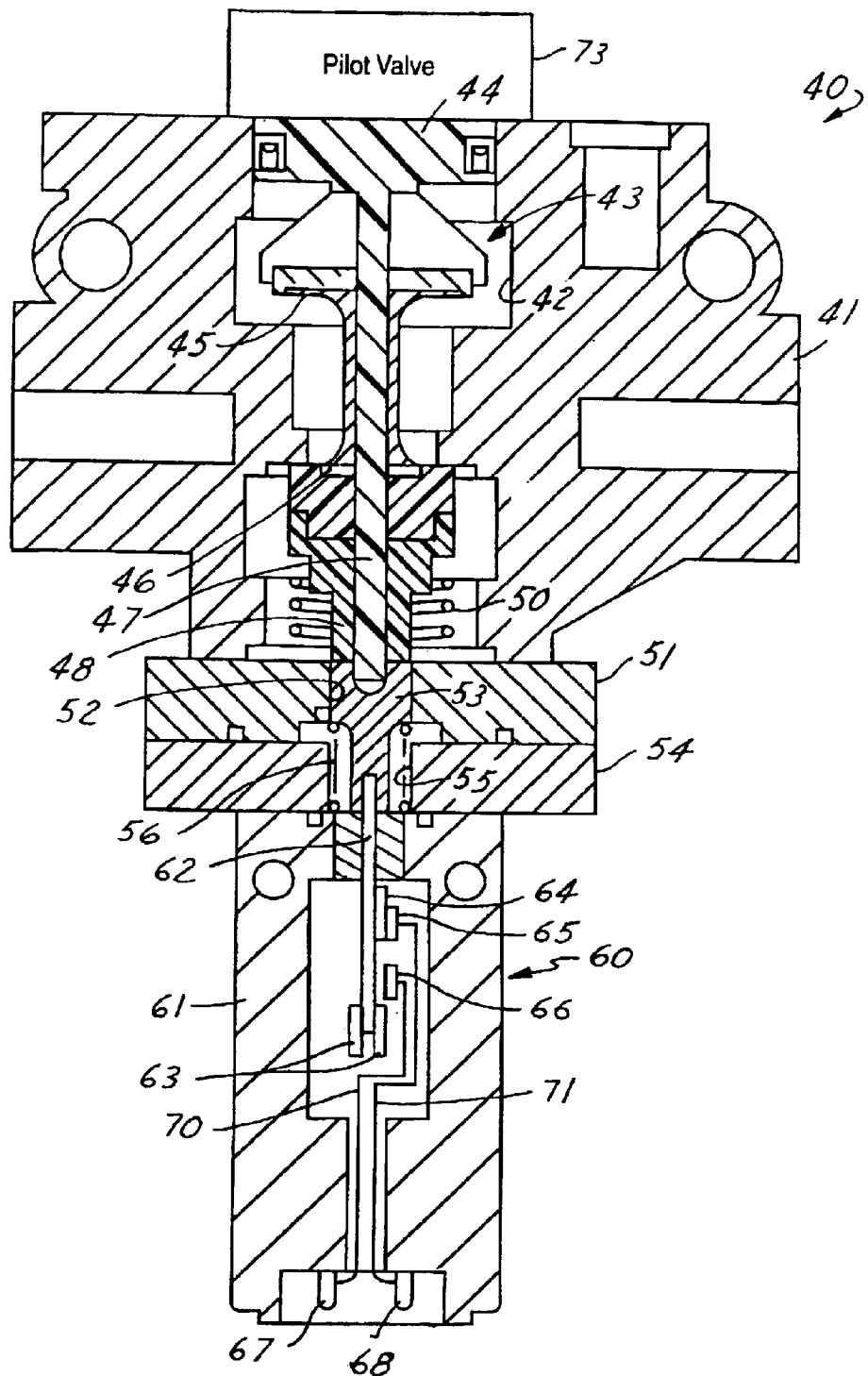
FIG. 4 is a side cross section of a monitored fluid control valve according to a first embodiment.

The present invention improves sensor switch reliability by using a positively driven sensing switch connection as shown in FIG. 4. A control valve 40 includes a valve body 41 having an elongated bore 42 accommodating a movable valve element 43. Movable valve element 43 includes a piston 44, an exhaust poppet 45, and an inlet poppet 46. A valve stem 47 retains various components of movable valve element 43 thereon, including a bottom piece 48. A valve return spring 50 is disposed between bottom piece 48 and an end adapter plate 51. An aperture 52 is provided in end adapter plate 51 for receiving bottom piece 48 and a valve stem extender 53. The current embodiment preferably comprises modifications to a non-monitoring type of valve wherein instead of an adapter plate 51 the non-monitoring valve would use an end cap having a recess for receiving bottom piece 48 and stem 47, but not providing an aperture completely through the end cap.

Valve stem extender 53 provides a portion of the direct drive connection of the present invention. A second end adapter plate 54 is mounted to end adapter plate 51 and has a matching aperture 55. A sensing switch 60 includes a switch body 61 mounted to end adapter plate 54.

Valve stem extender 53 may be fixably attached to valve stem 47. In the embodiment shown, however, valve stem extender 53 is slidably received on valve stem 47 and is kept in constant contact against valve stem 47 and bottom piece 48 by a spring 56 disposed between valve stem extender 53 and switch body 61.

Sensing switch 60 includes a switch arm 62 received at its upper end by a central aperture of valve stem extender 53 and guided at its lower end by a pair of guides 63. A conductive contact bridge 64 is affixed at an intermediate portion of switch arm 62. First and second electrical contacts 65 and 66 are spaced apart within switch housing 61 for slidably contacting contact bridge 64 when valve 40 is in its actuated position. A pair of connector blades 67 and 68 retained on switch body 61 are coupled to contacts 65 and 66 by lead wires 70 and 71, respectively. Other types of electrical switches could alternatively be used, such as any known arrangements of normally-open or normally-closed contacts and switches with combinations of such contacts.

Switch arm 62 is preferably press fit into valve stem extender 53 resulting in a direct connection that positively drives switch arm 62 in both directions along with movable valve element 43. By mechanically connecting the valve internals to the switch internals to create a positively driven sensing switch connection, the problem of excessive switch wear from impact forces as the internals contact one another is avoided. The invention does not rely on a switch return spring to return the switch internal components to their normal position (although a spring may be present due to the availability of mass-produced switches including such a spring). Instead, the switch internal components are moved back into normal position along with the valve internal components. Since the internals all move together as a unit, there is no impact force.

Figure 5:
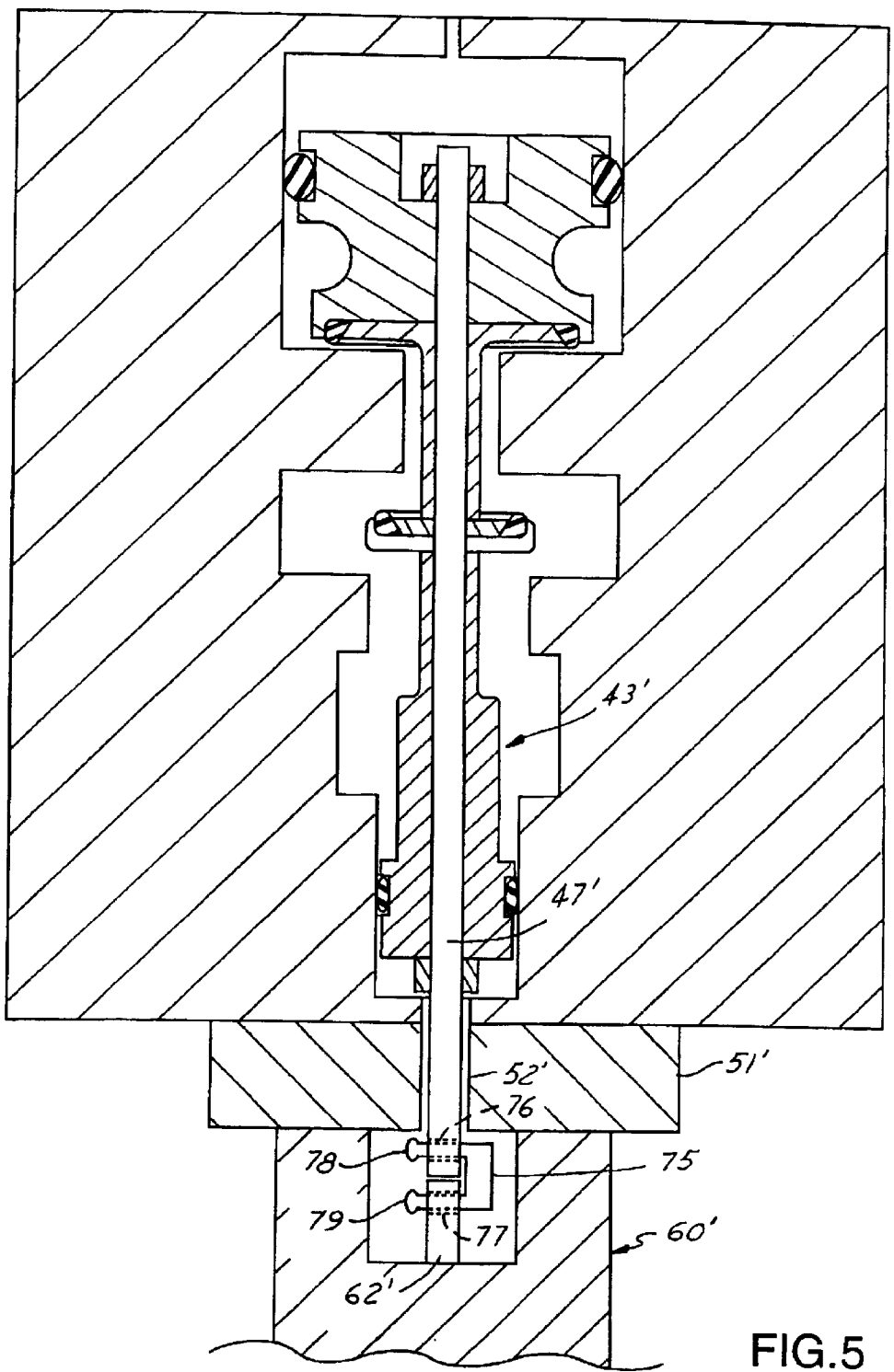
FIG. 5 is a side cross section of a monitored fluid control valve according to a second embodiment.

The mechanical connection between the valve internal components and the switch internal components can be achieved in a variety of ways. FIG. 5 shows an alternative embodiment wherein a movable valve element 43' includes a valve stem 47' of sufficient length to extend through adapter plate 51' and aperture 52' to interface with a switch arm 62' of a sensing switch 60'. In other words, a protruding portion of valve stem 47' is integrally formed on the stem. A linkage in the form of a generally U-shaped pin 75 joins stem 47' and switch arm 62' by passing through link passages 76 and 77, respectively. End portions 78 and 79 of U-shaped pin 75 may be deformed after passing through link passages 76 and 77 for retaining linkage 75 in place. A mechanical connection could alternatively be created by providing a moving profile that the switch operator follows, such as a hook-in-groove. Various snap-connections can also be used.

As a result of the foregoing arrangement, the electrical switch arm is operatively connected to the switch contacts for driving the switch contacts between an open state and a closed state. The switch arm is fixably coupled to the protruding portion of the stem whereby the switch arm is directly driven to match linear reciprocation of the movable valve element.

Figure 6:
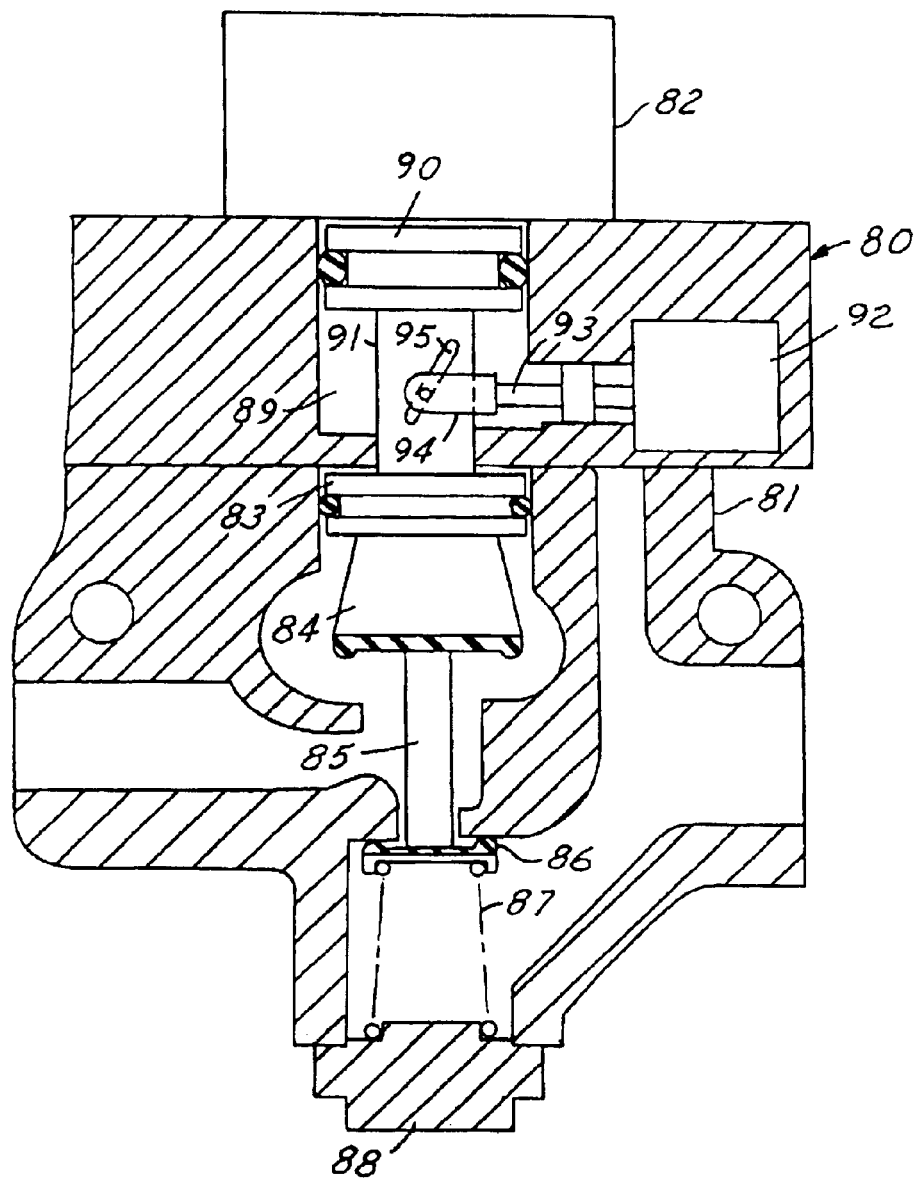
FIG. 6 is a side cross section of a monitored fluid control valve according to a third embodiment with the valve in a deactuated position.
Figure 7:
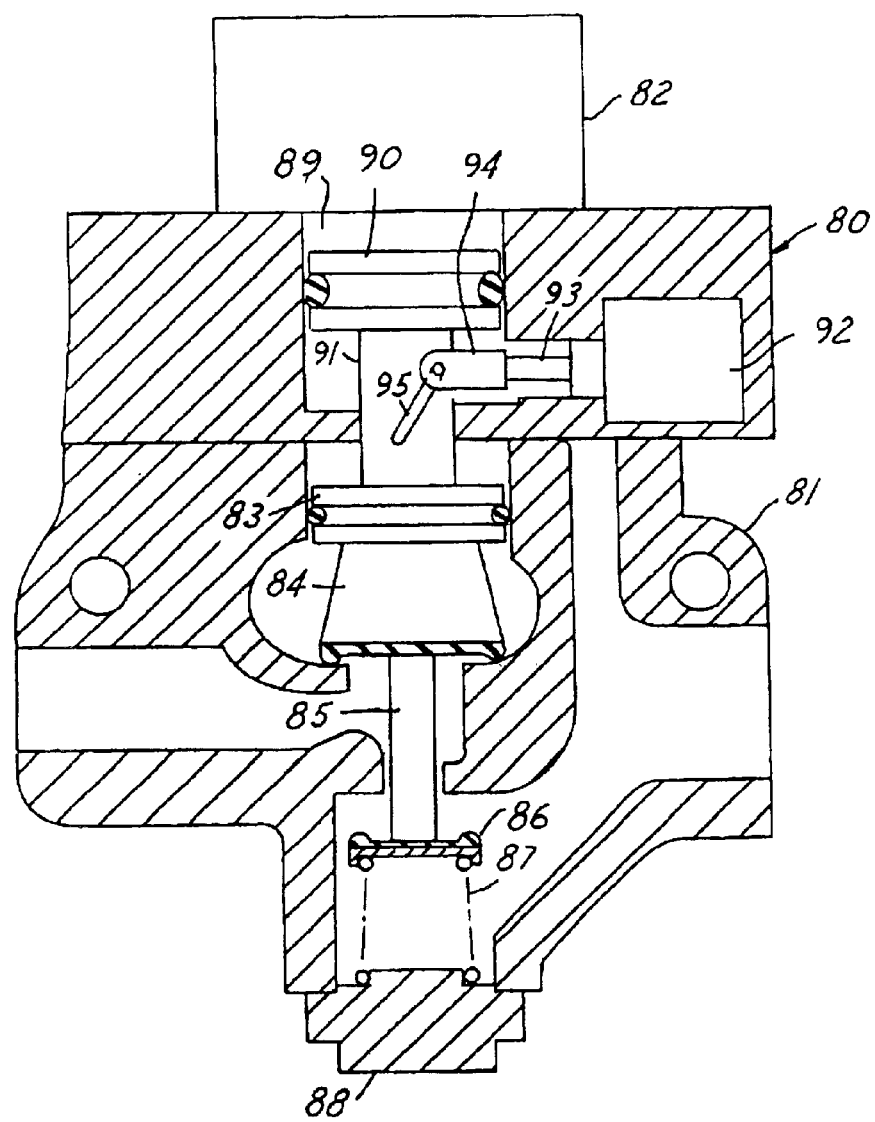
FIG. 7 is a side cross section of the valve of FIG. 6 in an actuated position.

FIGS. 6–9 illustrate another embodiment of the invention wherein a sensing switch assembly 80 is mounted to the top of a valve. In this embodiment, switch assembly 80 provides an optional accessory for a particular valve design by being insertable between a valve body 81 and a pilot valve 82. The main valve includes a piston 83 for driving a poppet 84, a valve stem 85, and a poppet 86. As shown in FIG. 6, the main valve is placed into a deactuated position by the action of a spring 87 located between poppet 86 and an end plate 88.

Switch assembly 80 has a bore 89 extending between pilot valve 82 and the top of valve body 81. A secondary piston 90 and piston rod 91 are slidably retained in bore 89 such that piston rod 91 is always in contact with piston 83. In other words, secondary piston 90, piston rod 91, piston 83, poppets 84 and 86, and stem 85 move together as a unit between the deactuated position of FIG. 6 (by virtue of spring force from spring 87 acting against poppet 86) and the actuated position of FIG. 7 (by virtue of pilot pressure acting against secondary piston 90).

Switch assembly 80 further includes a sensor switch 92 having a switch arm 93 coupled to a yoke 94. In the positive driving arrangement of the present embodiment, yoke 94 engages a slot 95 in piston rod 91. Slot 95 is angled to provide a cam surface that drives switch arm 93 in and out of sensor switch 92 in response to vertical movement of piston rod 91. In the deactuated position of FIG. 6, yoke 94 and switch arm 93 are driven to the left. In the actuated position of FIG. 7, yoke 94 and switch arm 93 are driven to the right. In the event that a sensor switch is utilized that includes its own internal spring (for providing normally-open or normally-closed contacts) then the sensor switch is preferably installed such that its rest position (i.e., position with the sensor spring extended) corresponds to the rest or deactuated position of the valve. This allows the valve to return to its "safe" position without having to overcome the spring force of the sensor switch.

The portion of bore 89 below secondary piston 90 is vented to atmosphere. Thus, the portions of switch assembly 80 containing sensor switch 92 and the positive drive mechanism are never pressurized and do not need to be sealed, thereby reducing the cost of the position monitoring assembly.

Figure 8:
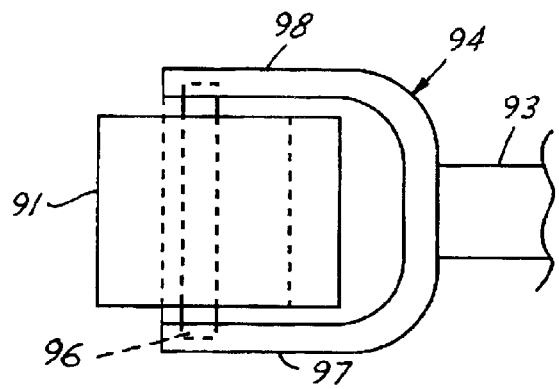
FIG. 8 is a top view of the interconnection of the switch arm and piston rod of the valve of FIGS. 6 and 7.
Figure 9:
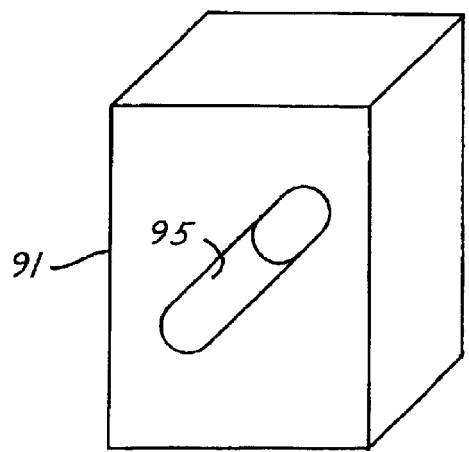
FIG. 9 is a perspective view of the piston rod.

As shown in FIG. 8, a pin 96 is fixedly mounted between arms 97 and 98 of yoke 94. Pin 96 extends through slot 95 and translates up-down motion of piston rod 91 into left-right motion of switch arm 93. It may be desirable to include a roller with pin 96 in order to reduce friction.

What is claimed is:

1. A monitored fluid control valve comprising:
   a valve body having an elongated bore;
   a movable valve element slidably received in said bore; and
   a switch assembly having an aperture aligned with said bore, said switch assembly including an electrical switch having a switch arm operatively connected to switch contacts for driving said switch contacts between an open state and a closed state, said switch arm being mechanically linked to said movable valve element through said aperture so that said switch arm is directly driven to match linear reciprocation of said movable valve element.

2. The control valve of claim 1 wherein said movable valve element is positioned in response to a pilot valve, wherein said switch assembly comprises a secondary piston and a piston rod disposed between said pilot valve and said moveable valve element, and wherein said switch arm is coupled to said piston rod.

3. The control valve of claim 2 wherein said piston rod includes an angled slot, and wherein said switch assembly further comprises a yoke for coupling said switch arm with said angled slot.

4. The control valve of claim 1 wherein said switch assembly further comprises an end plate for providing said aperture, wherein said movable valve element includes a protruding portion extending through said aperture, and wherein said switch arm is fixedly coupled to said protruding portion of said movable valve element.

5. The control valve of claim 4 wherein said protruding portion is integrally formed on said movable valve element.

6. The control valve of claim 4 wherein said protruding portion comprises a stem extender adjacent an end of a main stem portion.

7. The control valve of claim 6 further comprising a spring for biasing said stem extender against said main stem portion.

8. The control valve of claim 4 wherein said switch arm is press-fit to said protruding portion of said movable valve element.

9. The control valve of claim 4 further comprising a linkage for attaching said switch arm and said protruding portion of said movable valve element.

10. The control valve of claim 9 wherein said linkage comprises a pin.

* * * * *